(12) United States Patent
Schoeggl et al.

(10) Patent No.: US 8,718,863 B2
(45) Date of Patent: May 6, 2014

(54) METHOD FOR JUDGING THE DRIVABILITY OF VEHICLES

(75) Inventors: Peter Schoeggl, Hitzendorf (AT); Erik Bogner, Graz (AT)

(73) Assignee: AVL List GmbH, Graz (AT)

( * ) Notice: Subject to any disclaimer, the term of this patent is extended or adjusted under 35 U.S.C. 154(b) by 818 days.

(21) Appl. No.: 12/458,606

(22) Filed: Jul. 16, 2009

(65) Prior Publication Data

US 2010/0023202 A1    Jan. 28, 2010

(30) Foreign Application Priority Data

Jul. 24, 2008  (AT) ................................ A 1150/2008

(51) Int. Cl.
*G05B 23/02*   (2006.01)

(52) U.S. Cl.
CPC .... *G05B 23/024* (2013.01); *G05B 2219/45018* (2013.01)
USPC .......................... 701/33.1; 701/33.6; 701/34.1

(58) Field of Classification Search
CPC .................... G05B 23/024; G05B 2219/45018
USPC .......................... 702/29; 701/33.1, 33.6, 34.1
See application file for complete search history.

(56) References Cited

U.S. PATENT DOCUMENTS

| | | | | |
|---|---|---|---|---|
| 5,099,428 A | * | 3/1992 | Takahashi | 701/59 |
| 5,162,997 A | * | 11/1992 | Takahashi | 701/1 |
| 5,189,619 A | * | 2/1993 | Adachi et al. | 701/96 |
| 5,189,621 A | * | 2/1993 | Onari et al. | 701/102 |
| 5,576,961 A | * | 11/1996 | Genzel et al. | 701/101 |
| 6,023,668 A | * | 2/2000 | Genoux | 702/187 |
| 6,079,258 A | * | 6/2000 | List et al. | 73/118.01 |
| 6,317,666 B1 | * | 11/2001 | List et al. | 701/29.1 |
| 6,598,467 B1 | | 7/2003 | Schoggl et al. | |
| 6,937,924 B1 | * | 8/2005 | Statler et al. | 701/14 |
| 7,263,425 B2 | * | 8/2007 | Bleile et al. | 701/102 |
| 7,610,127 B2 | * | 10/2009 | D'Silva et al. | 701/33.9 |
| 7,751,955 B2 | * | 7/2010 | Chinnadurai et al. | 701/29.3 |
| 2003/0050742 A1 | * | 3/2003 | Sakamoto et al. | 701/1 |
| 2003/0078700 A1 | * | 4/2003 | Chee | 701/1 |
| 2004/0122604 A1 | * | 6/2004 | Gelsomino | 702/56 |
| 2005/0022587 A1 | * | 2/2005 | Tentrup et al. | 73/116 |
| 2006/0085119 A1 | * | 4/2006 | Damitz et al. | 701/111 |
| 2006/0282197 A1 | * | 12/2006 | Schoggl | 701/1 |
| 2007/0213885 A1 | * | 9/2007 | D'Silva et al. | 701/1 |
| 2007/0265743 A1 | * | 11/2007 | Kojitani et al. | 701/29 |
| 2008/0201054 A1 | * | 8/2008 | Grichnik et al. | 701/102 |

(Continued)

OTHER PUBLICATIONS

List et al., "Objective Evaluation of Vehicle Driveability" in SAE 1998, 980204.

*Primary Examiner* — Mark Hellner
*Assistant Examiner* — Ari M Diacou
(74) *Attorney, Agent, or Firm* — Dykema Gossett PLLC

(57) ABSTRACT

A method for judging the drivability of vehicles including acquiring drivability-relevant physical data during the driving operation of the vehicle; checking the data for the presence of trigger conditions which indicate the existence of specific driving states; if a specific driving state exists, calculating at least one local evaluation, which is a judgment of an evaluation criterion relevant for the driving state; and calculating an overall evaluation for the acquired driving state. An increase in precision may be achieved with repeated occurrence of identical driving states, a correction variable is calculated for the evaluations, which is a function of the differences in the behavior of the vehicle upon identical driving states, and a corrected evaluation is calculated in which this correction variable is taken into consideration.

15 Claims, 2 Drawing Sheets

(56) References Cited

U.S. PATENT DOCUMENTS

| | | | |
|---|---|---|---|
| 2008/0306666 A1* | 12/2008 | Zeng et al. | 701/70 |
| 2009/0293457 A1* | 12/2009 | Grichnik et al. | 60/286 |
| 2010/0125387 A1* | 5/2010 | Sehyun et al. | 701/36 |
| 2010/0170330 A1* | 7/2010 | Scheepers et al. | 73/116.01 |
| 2010/0174444 A1* | 7/2010 | Hansson et al. | 701/33 |

* cited by examiner

METHOD FOR JUDGING THE DRIVABILITY OF VEHICLES

BACKGROUND OF THE INVENTION

1. Field of the Invention

The present invention relates to a method for judging the drivability of vehicles having the following steps:
- acquiring drivability-relevant physical data during the driving operation of the vehicle;
- checking the data for the presence of trigger conditions which indicate the existence of specific driving states;
- if a specific driving state exists, calculating at least one local evaluation, which is a judgment of an evaluation criterion relevant for the driving state; and
- calculating an overall evaluation for the acquired driving state.

2. The Prior Art

The drivability of vehicles has increasingly proven to be essential in recent years for the judgment of the vehicle by consumers and thus for the economic success and the sales numbers. Significant efforts have been made in order to make the evaluation of the drivability of a vehicle by measuring methods objective and avoid subjective evaluations by test drivers as much as possible.

The applicant of the present application has already presented systems for evaluating the drivability of vehicles many years ago, which were published in EP 0 846 945 A, EP 0 984 260 A, and EP 1 085 312 A. A further description of these systems is found in the paper SAE 1998, 980204 LIST Helmut, SCHÖGGL Peter: "Objective Evaluation of Vehicle Drivability".

The basic idea of all of these known methods and devices is that a plurality of data is recorded during the driving operation of a vehicle, from which evaluation variables are obtained using mathematic and statistical methods. These evaluation variables are related to specific driving states of the vehicle, which are automatically detected and recognized by the system on the basis of the data. This recognition is performed by so-called trigger conditions, i.e., specific constellations of measured values which allow it to be concluded that the particular driving state exists.

The setting of such a system is performed so that, firstly, driving states are defined and trigger conditions are established. Then, in a training phase having different test drivers and different vehicles, drivability-relevant data are recorded and corresponding evaluations are output by the test drivers. These evaluations are converted into functions, using mathematical and statistical methods, such as regression analysis, fuzzy logic, neuronal nets, and the like, which calculate the evaluation variables with respect to physical data in such a way that the most optimum possible imaging of the subjective judgments of the individual test drivers is achieved. The system prepared and calibrated in this way may then be used for new vehicles, in order to generate the drivability evaluations automatically. The subject of the present invention is primarily the construction and the mode of operation of the calibrated system.

The fundamental construction of such systems may be summarized as follows:

Physical Data

The system continuously records physical data during the typical driving of a vehicle. On the one hand, this is primarily raw data which may be taken from the existing vehicle electronics, for example, such as engine speed, coolant water temperature, gas pedal setting, or the like. Additional data which are needed but may not be provided directly by the vehicle are ascertained by appropriate sensors, such as longitudinal and lateral acceleration, vehicle noise, vibrations, or the like. Typically, in a further step, processed physical data are obtained from these physical raw data, such as speed variation, bucking frequency, switching times, clutch engagement bucking, expected acceleration/deceleration capability, and the like.

Driving States

In order to allow a detailed judgment of all properties of the vehicle, manifold vehicle states are defined. For example, these are idle, engine startup, starting, positive and negative load change, overrun, shifting, or the like. Trigger definitions are defined for each of these driving states, i.e., constellations of the physical data through which the existence of the particular driving state may be recognized. In more elaborate systems, the driving states themselves are even hierarchically subdivided, mainly into a lower aggregation level such as positive load change after overrun, positive load change after shifting or shifting at partial load, shifting at partial load, single shifts, multiple shifts, etc., and driving states of a higher aggregation level, in which the various positive load change driving states are summarized in a general driving state of positive load change and the various shifting driving states are summarized in a general driving state of shifting.

At least one evaluation criterion is defined for each driving state. There are typically multiple evaluation criteria for each driving state. These evaluation criteria are evaluation aspects for judging the relevant driving state. During the driving state tip-in, for example, the response delay may be an evaluation criterion and the bucking during the acceleration procedure may be another evaluation criterion.

Local Evaluations

Local evaluations are variables which express the quality of the driving state in regard to the particular evaluation criterion. These local valuations are typically scaled to a value spectrum between 1 and 10, 10 representing an excellent evaluation, 9 being evaluated as meeting customer expectations, 8 as meeting most customer expectations, 7 as annoying for some drivers, etc. The local evaluations are derived by mathematical functions from the physical data on the basis of the findings obtained in the training phase.

Overall Evaluation

An overall evaluation for the driving state may be calculated by summary from the various local evaluations of the evaluation criteria of a specific driving state. This is performed in the simplest case by calculating a weighted average. A variable which moves in the range between 1 and 10 is in turn also the overall evaluation of a driving state.

Overall Index

An overall index, which is representative of the drivability of the vehicle, can optionally be calculated from all overall evaluations of the various driving states.

If a sufficiently extensive and long study time period is provided, it is obvious that many driving states will occur multiple times. This is also essential for the precision and reproducibility of the results, in order to compensate for the unavoidable statistical scattering during each measuring procedure. In known systems, each individual driving state is evaluated after its occurrence and the evaluations of all similar driving states are averaged. This means that for the driving state "positive load change after overrun", for example, which has occurred 20 times during the measuring cycle, 20 evaluation sets are calculated (i.e., for example, 20 local evaluations for the evaluation criterion "response delay" and 20 local evaluations for the evaluation criterion "multiple oscillations" and 20 overall evaluations for the driving state "positive load change after overrun"), which are then each processed further to form an averaged evaluation.

It has been shown that the subjective findings of test drivers may be imaged largely objectively using the method described above. The existing deviations have been attributed up to this point to unavoidable variations, deviations, measuring errors, or other unknowns.

The present invention has the object of minimizing these existing deviations further, in order to achieve better correspondence of the calculation results with the subjective evaluations.

SUMMARY OF THE INVENTION

It is provided according to the invention that upon repeated occurrence of identical driving states for the evaluations, a correction variable is calculated, which is a function of the differences in the behavior of the vehicle during the identical driving states, and a corrected evaluation is calculated, in which this correction variable/deviation is taken into consideration.

The fundamental principle of the present invention is based on the consideration that the average behavior of the vehicle during a specific type of driving state is not solely decisive for the evaluation of this driving state. It is to be observed that the reproducibility of the behavior with respect to a specific driving state is also an important quality or comfort feature. In other words, most drivers will judge a vehicle which behaves moderately well with respect to a specific driving state every time as better in the end effect than another vehicle Which sometimes behaves significantly better but also sometimes behaves significantly worse upon occurrence of this driving state. In order to take this circumstance into consideration, a mean value over the individual evaluations of a specific driving state is not simply calculated in the method according to the invention, but rather the variation of the behavior is also taken into consideration via a correction variable. Expressed mathematically, such a consideration may be performed as follows:

Firstly it is assumed that a specific driving state is detected n times during a test cycle. Therefore, n sets of local evaluations may be obtained from the n events, one of which is selected as a local evaluation lB, for example. Firstly, according to equation (1), a mean value MW is calculated from the n local evaluations lB:

$$MW = \frac{1}{n}(lB_1 + lB_2 + \ldots + lB_n) \quad (1)$$

In the method according to the prior art, this mean value would be the local value which was finally output for the relevant evaluation criterion. However, in the method according to the invention, firstly a deviation $\Delta W$ from the mean value MW is calculated for each individual value of the local evaluation lB:

$$\Delta W_i = lB_i - MW \quad (2)$$

A correction variable is calculated in equation (3) from the n deviations $\Delta W$ obtained from equation (2), a matching function f being used:

$$KG = f(\Delta W_1, \Delta W_2, \ldots \Delta W_n) \quad (3)$$

Finally, a corrected local evaluation lB is calculated in equation (4), taking the correction variable into consideration:

$$lB = MW - KG \quad (4)$$

The above calculation methods according to equations (1) through (4) may be used, for example, for the local evaluation for the evaluation criterion "bucking" during the driving state "tip-in". Parallel thereto, for other evaluation criteria of the driving state "tip-in", further corrected local evaluations are calculated. The overall evaluation for the driving state "tip-in" may be calculated, on the one hand, in a way known per se by calculating a weighted average from the individual corrected local evaluations, but a calculation method may also be used, in which an overall evaluation is calculated from each of the individual local evaluations and the n overall evaluations thus obtained are processed further to form a corrected overall evaluation according to the method of equations (1) through (4) (instead of local evaluations lB, corresponding overall evaluations GB would be used in equations (1) through (4)).

A preferred embodiment variant of the invention provides that a measure of the differences of the individual evaluations, preferably the variance of the evaluations in identical driving states, is used as the correction variable. If no special information exists about the nature of the perception for the individual test persons, the most universal measure has proven to be essentially using the variance of the individual evaluations as the correction variable. Practically, this means that above equation (3) is concretely expressed by equation (5):

$$KG = \frac{K}{n-1}(\Delta W_1^2 + \Delta W_2^2 + \ldots + \Delta W_n^2) \quad (5)$$

The correction variable KG represents the variance of the individual deviations $\Delta W$, multiplied by a proportionality factor K, which must be empirically determined for the particular driving state and the particular evaluation criterion. The correction variable of equation (5) may be processed further as above in equation (4), instead of the subtractive consideration, however, a correspondingly designed multiplicative calculation also being able to be performed, which is specified, for example, in equation (6):

$$lB = MW(1-KG) \quad (6)$$

A further variant of the method according to the invention provides that a measure of the differences in a physical variable which is essential for the evaluation is used as the correction variable. It is firstly to be established that a specific physical variable is of predominant importance for an array of evaluation criteria and other physical variables only play a subordinate, but nonetheless important role. Thus, for example, for the driving state "idle", the evaluation criterion "idle speed" is primarily a function of a physical variable "average speed", i.e., a value of the speed which is averaged over a specific observation time. However, further physical variables are also included in the local evaluation of the idle speed, such as the engine temperature, because an increased idle speed is viewed as advantageous when the engine is cold.

An equation will now result during the training of the system for the local evaluation "idle speed", in which the highest grade is achieved when the average speed as a function of the engine temperature is at an optimal perceived value. The local evaluation will thus be worse the further the actual average speed is from this optimal value. Instead of above equation (1), a modified mean value MW' is calculated in following equation (7), which is calculated as an average of the individual physical variables $phG_i$:

$$MW' = \frac{1}{n}(phG_1 + phG_2 + \ldots + phG)_n \tag{7}$$

In equation (8), which replaces equation (2), the deviations $AW_i$ are calculated from the individual physical variables $phG_i$. As noted above, phG may be the average idle speed, for example. The alternative calculation method described here has the advantage that it is also applicable to those evaluation criteria in which it is not important that specific physical variables or constellations of physical variables assume the greatest possible or least possible value, but rather an optimum value is desired. This alternative calculation method may thus also include cases in which the idle speed during the individual events "idle" deviates alternately upward and downward, which is not correspondingly imaged by the local evaluations, however, because an excessively high idle speed may result in the same local evaluation as an excessively low idle speed. As noted above, however, a uniformly excessively low idle speed would be perceived as more pleasant than an idle speed which is excessively high once and excessively low once, for example. This phenomenon may be taken into consideration correspondingly by equations (7) and (8):

$$\Delta W_i = phG_i - MW' \tag{8}$$

A further favorable embodiment variant of the present invention provides that a function is used for the calculation of the correction variable in which the time between the occurrence of individual driving states and the sequence of the deviations is taken into consideration. In this way, the circumstance is considered that a change of the behavior is typically perceived as more annoying the shorter the intervals between the individual events. Thus, for example, instead of equations (1) through (3), in following equation (9), a value $Diff_i$ may first be calculated for each local evaluation from the second occurrence of a driving state, which expresses the difference between the individual local evaluations, divided by the time span t between the moment of the occurrence of the particular driving state and the moment at which the relevant driving state occurred the last time:

$$Diff_i = \frac{1}{t}(lB_1 - lB_{i-1}) \tag{9}$$

The individual values $Diff_i$ are processed similarly to equation (3) to form a correction variable by application of a matching function:

$$KG = f(Diff_2, Diff_3, \ldots Diff_n) \tag{10}$$

Again, for example, the variance is a simple and reasonable function of this type, as may be seen from equation (11):

$$KG = \frac{K}{n-2}(Diff_2^2 + Diff_3^2 + \ldots + Diff_n^2) \tag{11}$$

K again denotes an empirically ascertained proportionality factor.

It is possible per se to correct individual local evaluations according to the method described above, but to calculate other local evaluations in a typical way if it proves during the training phase of the system that changes are not perceived as critical here. However, it is particularly preferable to subject all local evaluations to the formulas described above.

In addition to a calculation on the basis of the above formulas, it is also possible in simplified cases, however, to only use extreme values of individual local evaluations and/or physical variables for the calculation of the correction variable. This may be performed, for example, in that extreme values are weighted more strongly in the calculation of the corrected local evaluation.

As already noted above, a corrected overall evaluation may be calculated from the corrected local evaluations in various ways. In the simplest case, the individual local evaluations are weighted in accordance with the significance of the corresponding evaluation criterion and processed to form an average, which represents the overall evaluation of the relevant driving state.

A further particularly preferred embodiment variant of the method according to the invention provides that a main influencing variable is defined for at least one evaluation criterion, which is essential for the judgment of this evaluation criterion, and a target value is calculated for this main influencing variable, which would result in an optimum evaluation when taking the remaining influencing variables into consideration, and the deviation of the main influencing variable from this target value is used to calculate the correction variable.

When applied to the above example of the idle speed, an optimum idle speed $nL_{opt}$ may thus be defined for every engine temperature TMot. This is the idle speed which results in the highest possible evaluation. If this function is identified by g, this relationship assumes the form of the following equation (12):

$$nL_{opt} = g(TMot) \tag{12}$$

The function g is empirically obtained in that the average idle speed is related to the associated evaluation for a plurality of different engine temperatures TMot, and for each engine temperature, the average idle speed having the highest evaluation is ascertained. The individual deviations $AW_i$ result as the difference of the actual measured average idle speed from the above-determined optimum value according to equation (13):

$$\Delta W_i = nL_i - nL_{opt} \tag{13}$$

The average value is calculated from the deviations according to equation (1), the correction variable results from formula (3), and the corrected local evaluation may be calculated according to equation (4).

It is particularly advantageous if the deviation of the main influencing variable from the target value is taken into consideration separately for various ranges of the remaining influencing variables.

In this way, for example, the deviations at low, moderate, and high engine temperatures may be processed into separate correction variables, which are taken into consideration separately during the calculation of the corrected local evaluation. In this way, it is possible to also suitably consider a behavior in which, for example, the idle speed at moderate and high engine temperatures always lies close to the optimum value, but deviates significantly therefrom at low engine temperature. This finding may be used not only for improved calculation of a corrected local evaluation, but rather may also provide indications of concrete deficiencies and/or possible improvement strategies.

A further example is a traction upshift in a vehicle having an automatic transmission or double clutch transmission. At low loads, a soft and smooth shift is typically expected and desired. At high loads and speeds, a rapid shift without noticeable traction force reduction is desired. It is therefore advisable to observe and analyze the particular deviations in the behavior separately for these two different ranges.

Furthermore, it is particularly advantageous if the particular driver type is taken into consideration in the calculations described above. This may be performed in manifold ways. On the one hand, it is possible to select various driver types during the calibration of the system and to prepare a separate parameter set for each driver type. This may be performed specifically by country, for example. If one establishes that the requirements and expectations of a Swedish car driver are significantly different from those of an Italian car driver, the system may be adapted on the one hand for an Italian car driver and on the other hand for a Swedish car driver, which results in the possibility of evaluating and then adapting a given vehicle for the Italian market on the one hand and for the Swedish market on the other hand. However, it is also possible to characterize various driver types, such as sporty or comfort-oriented, and to acquire the particular driver type automatically during the driving of the vehicle. Thus, for example, generous and rapid movements of the gas pedal indicate a sporty driver more. As a function of the detected driver type, different functions may then be used for the calculation of the evaluations of the driving state. In the example described above of the traction upshift in a vehicle having automatic transmission, in the event of a very sporty driver, a significantly more noticeable engagement buck may be perceived as entirely positive, although such a buck would normally result in a poor evaluation. In addition to an automatic evaluation of the driver type, it is also possible to use additional indices, such as pressing a sport button in vehicles which provide it.

The system according to the invention is primarily intended for use in vehicles which drive on the road. However, it is also possible with slight modifications to use the system in test stand operation. Thus, for example, a vehicle may be studied on a roller test stand. The unavailable data such as longitudinal acceleration must be calculated by a suitable model. It is also possible, however, to use the system on an engine test stand if the vehicle is not available or is not yet available. The available data, such as engine speed or torque, are also transmitted directly to the system according to the invention here, while the unavailable data must be calculated by a simulation model. However, it is then also possible to image the entire vehicle by a simulation model and transmit the calculated data to the system according to the invention, in order to execute the calculations described above.

The calculation of the evaluation variables may fundamentally be performed online, or also offline. Online calculation means that the data from the vehicle are acquired and processed in real time, so that it is possible to display the individual evaluation variables directly on an observation station in the vehicle or, in the event of telemetric transmission, a fixed observation station. However, all data are typically recorded and analyzed at a later time.

Furthermore, the present invention relates to a device for judging the drivability of vehicles having a data acquisition unit for acquiring drivability-relevant physical data during the driving operation of the vehicle having a calculation unit for checking the data for the existence of trigger conditions, which indicate the existence of specific driving states and for calculating at least one local evaluation, which is a judgment of an evaluation criterion relevant for the driving state and, furthermore, calculating an overall evaluation for the acquired driving state, and having an output unit for displaying physical data and evaluations.

It is provided according to the invention that the calculation unit is implemented for the purpose, in the event of repeated occurrence of identical driving states, of calculating a correction variable for the evaluations, which is a function of the differences in the behavior of the vehicle in the identical driving states, and of calculating a corrected evaluation in which this correction variable is considered.

It is particularly favorable if the data acquisition unit comprises sensors for acquiring drivability-relevant physical data and also has an interface to the vehicle electronics. The sensors are, for example, acceleration sensors for acquiring the longitudinal acceleration and the lateral acceleration and the like. The interface to the vehicle electronics provides all available drivability-relevant data here.

If the vehicle is analyzed on a roller test stand or an engine test stand, the relevant data are supplied into the system via an interface to the test stand.

The invention is explained in greater detail hereafter on the basis of the embodiment variants shown in the drawings, wherein.

Figure 1:
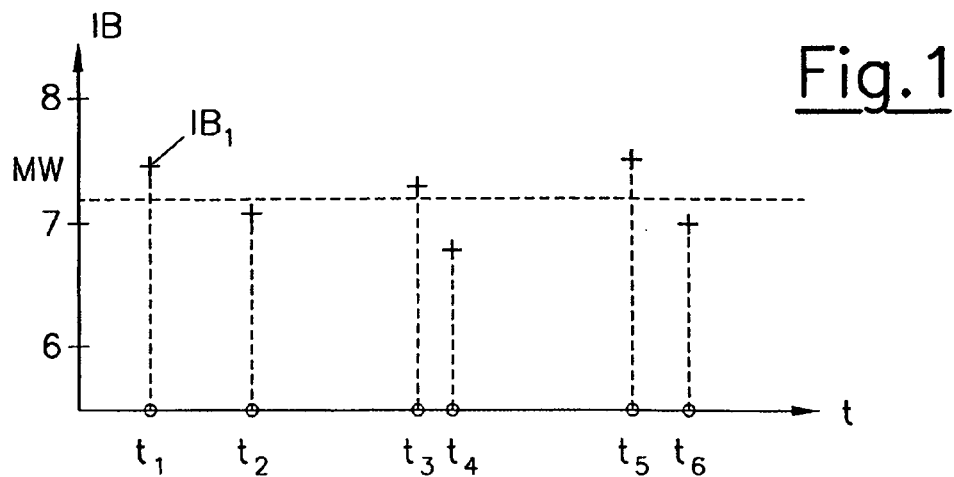
FIGS. 1, 2 and 3 show diagrams which explain the invention.

The diagram of FIG. 1 represents the chronological occurrence of a specific driving state and the associated local evaluation of an evaluation criterion. The time t is plotted on the horizontal axis, while a typical local evaluation lB is plotted on the vertical axis. In the example shown in FIG. 1, a specific driving state, such as "positive load change after overrun" is recognized at six specific times $t_1, \ldots t_6$. At these times, a local evaluation $lB_1, \ldots$ etc. is calculated accordingly for a specific evaluation criterion such as "response delay". The mean value MW of these various individual local evaluations $lB_1, \ldots$ etc. is shown by a horizontal interrupted line in FIG. 1 and is 7.2 in the present example.

Figure 2:
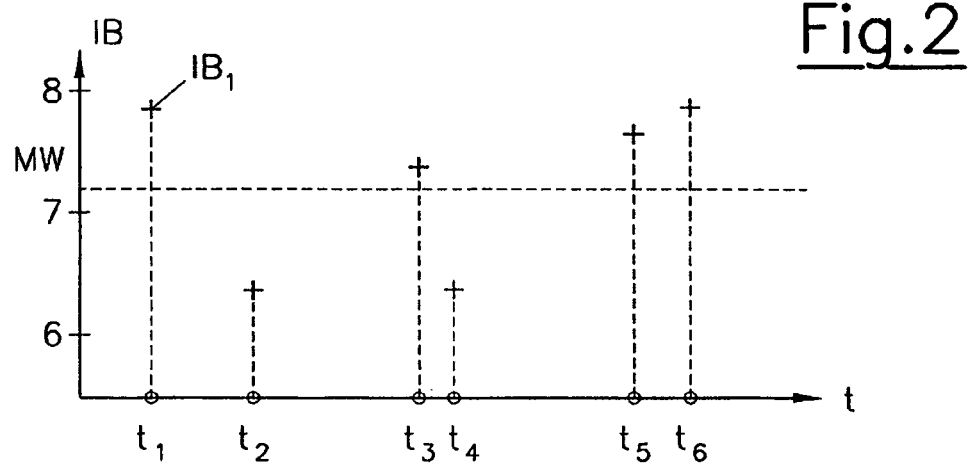

The identical state of affairs for another vehicle is shown in FIG. 2. It is obvious that six individual local evaluations $lB_1, \ldots$ etc. are also obtained at different times $t_1, \ldots t_6$, the mean value MW again being 7.2. It is also obvious, however, that the individual local evaluations $lB_1, \ldots$ etc. scatter significantly further around the mean value MW than is the case in the example of FIG. 1. A corrected local evaluation lB for the evaluation criterion "response delay" is thus calculated using the method according to the invention, which is higher for the vehicle of FIG. 1 than for the vehicle of FIG. 2.

Figure 3:
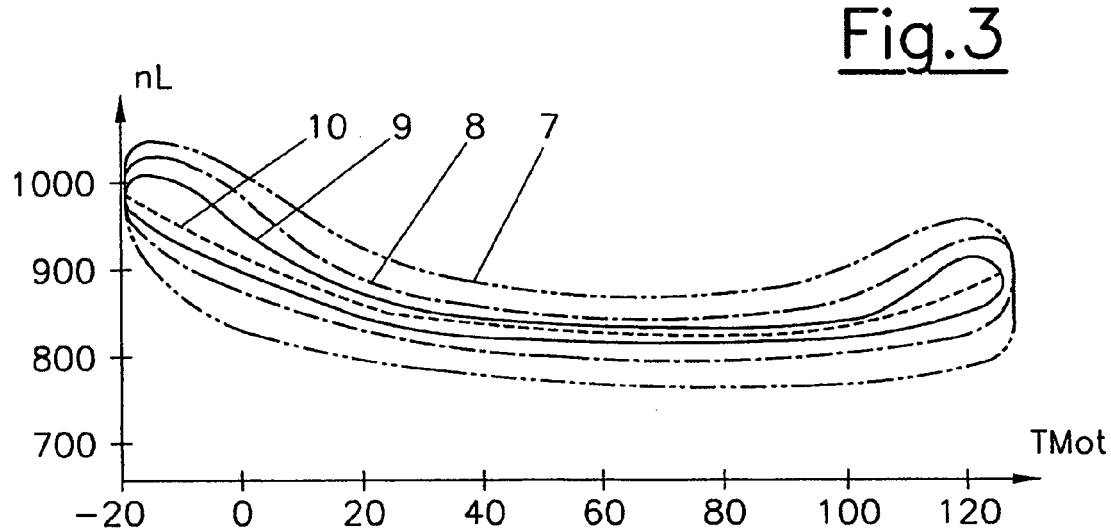

In FIG. 3, the evaluation of the evaluation criterion "idle speed" is plotted as a function of the physical variables average speed nL and engine temperature TMot. The interrupted line represents the value pair at which the idle speed is optimum with respect to the particular engine temperature. This is evaluated correspondingly with the highest grade 10. The solid line encloses the area in which the local evaluation is ≥9. Similarly, the dot-dash line and the double-dotted line represent areas in which the local evaluation is ≥8 or ≥7, respectively. It is firstly obvious from this curve that at very low engine temperatures, the optimum engine speed is greater than at operating temperature and also rises somewhat at high temperatures. It is also obvious that at very low temperatures or at very high temperatures, the tolerance is somewhat higher than at normal operating temperature, because the evaluation ranges are somewhat broader here. A more differentiated judgment for different engine temperatures TMot contributes here to increasing the judgment quality.

Figure 4:
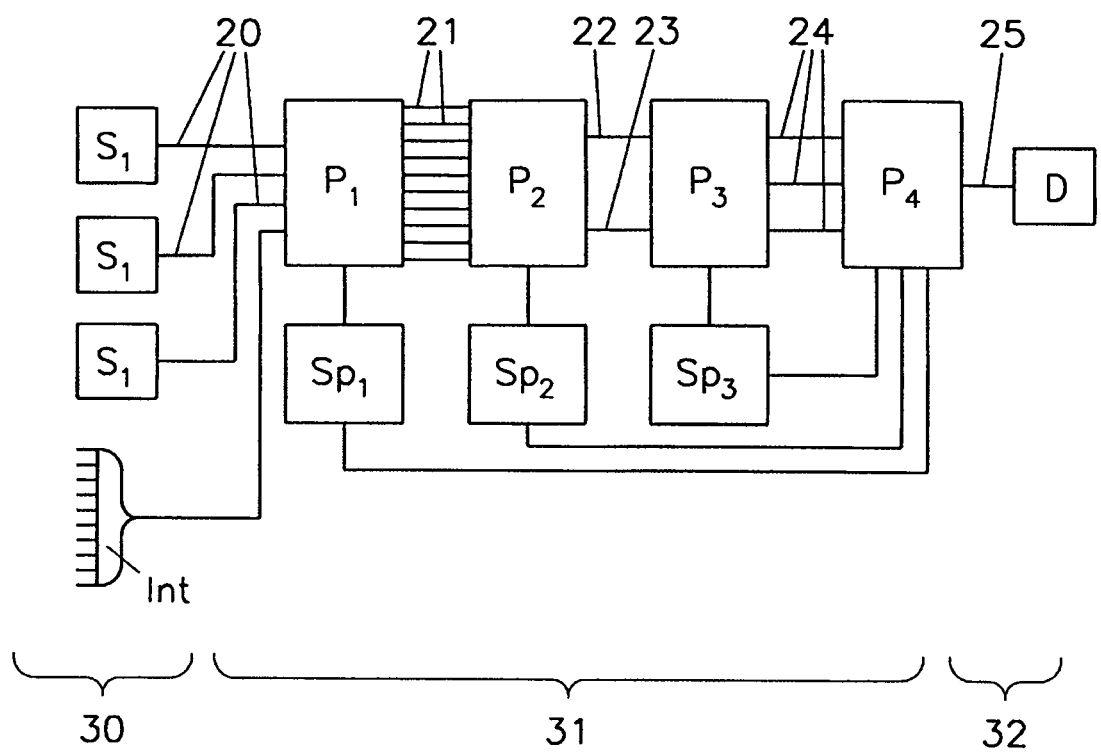
FIG. 4 shows a block diagram of the device according to the invention.

FIG. 4 schematically shows the construction of an evaluation system according to the invention as a block diagram. Various physical variables are acquired via individual sensors $S_1$, $S_2$, $S_3$, such as the longitudinal acceleration, noises, vibrations, or the like. Further physical variables are requested via an interface Int from the vehicle electronics. Overall, the sensors $S_1$, $S_2$, $S_3$ and the interface Int are referred to as the data acquisition system 30.

The measured values are transmitted via data lines 20 to a first computing unit $P_1$, which is connected to a memory $Sp_1$. In this first computing unit $P_1$—as described above—processed physical data are derived, such as speed variation, bucking frequency, shift times, engagement bucking, etc. The various physical data are stored in the memory $Sp_1$. These data are transmitted via data lines 21 to a second computing unit $P_2$, which is connected to a second memory $Sp_2$. Formulas and parameters are stored in this memory $Sp_2$, which allow the second processing unit $P_2$ to identify the occurrence of various driving states on the basis of trigger conditions.

The physical data relevant for the acquired driving state are transmitted via a data line 22 to a third computing unit $P_3$ and information about the acquired driving state is transmitted simultaneously via a further data line 23. In the computing unit $P_3$, the various local evaluations are calculated from these data and stored in a third memory $Sp_3$. These local evaluations are relayed via data lines 24 to a fourth computing unit $P_4$, which is also connected to the memories $Sp_1$, $Sp_2$, and $Sp_3$ and in which the mean values, correction values, and corrected local evaluations may be calculated in the way described above. Furthermore, the overall evaluations and the overall index are also calculated and output via a data line 25. These may be displayed and analyzed in a display unit D.

The computing units $P_1$, $P_2$, $P_3$, and $P_4$ are referred to jointly as the calculation unit 31 and may also be physically combined in one device. An output unit is generally identified by 32.

The present invention allows the evaluation of the drivability of vehicles to be refined further and to be represented with increased precision and reproducibility.

The invention claimed is:

1. A method for judging the drivability of a vehicle comprising the sequential steps of:
   acquiring drivability-relevant physical data during driving operation of the vehicle;
   checking the data for the presence of trigger conditions which indicate the existence of specific driving states;
   if a specific driving state exists, calculating at least one local evaluation, which is a judgment of an evaluation criterion relevant for the driving state; and
   calculating an overall evaluation for the acquired driving state; wherein upon repeated occurrence of identical driving states, a correction variable is calculated for the evaluations, which is a function of differences in behavior of the vehicle upon identical driving states, and a corrected evaluation is calculated, in which this correction variable is considered, and performing at least one of recording, displaying or outputting the physical data and/or overall evaluations automatically to a system.

2. The method according to claim 1, including variances of the evaluations upon identical driving states as a correction variable.

3. The method according to claim 1, including using a correction variable as a measure of the differences in a physical variable, which is essential for the evaluation.

4. The method according to claim 1, wherein a function is used for the calculation of the correction variable in which the time between the occurrence of individual driving states and the sequence of the deviations are taken into consideration.

5. The method according to claim 1, including calculating a corrected local evaluation for each local evaluation of a driving state.

6. The method according to claim 5, including calculating a corrected overall evaluation from corrected local evaluations.

7. The method according to claim 1, wherein a main influencing variable is defined for at least one evaluation criterion, which is essential for the judgment of this evaluation criterion, and a target value is calculated for this main influencing variable, which would result in an optimum evaluation in consideration of the remaining influencing variables, and the deviation of the main influencing variable from this target value is used to calculate the correction variable.

8. The method according to claim 7, wherein the deviation of the main influencing variable from the target value is taken into consideration separately for various ranges of the remaining influencing variables.

9. The method according to claim 1, wherein at least one characteristic variable is derived from the physical data, which represents the type of the particular driver, and this characteristic variable is taken into consideration upon the evaluation.

10. The method according to claim 1, wherein the driving operation of the vehicle is performed on a test stand.

11. The method according to claim 1, wherein the driving operation of the vehicle is simulated by a model.

12. A device for judging the drivability of vehicles, comprising:
   a data acquisition unit for acquiring drivability-relevant physical data during the driving operation of the vehicle;
   a calculation unit for checking the data for the existence of trigger conditions, which indicate the existence of specific driving states, and for calculating at least one local evaluation, which is a judgment of an evaluation criterion relevant for the driving state, and also calculating an overall evaluation for the acquired driving state, and
   an output unit for displaying physical data and evaluations, wherein the calculation unit upon repeated occurrence of identical driving states of calculates a correction variable for the evaluations, which is a function of the differences in the behavior of the vehicle upon the identical driving states, and further calculates a corrected evaluation in which this correction variable is considered.

13. The device according to claim 12, wherein the data acquisition unit comprises sensors for acquiring drivability-relevant physical data and also has an interface to the vehicle electronics.

14. The device according to claim 12, wherein the data acquisition unit has an interface to a roller test stand or engine test stand.

15. The device according to claim 12, wherein the data acquisition unit has an interface to a vehicle simulation model.

* * * * *